(12) United States Patent
Spalding

(10) Patent No.: US 12,173,899 B2
(45) Date of Patent: Dec. 24, 2024

(54) COMBUSTION QUALITY SPECTRUM

(71) Applicant: Baker Hughes Holdings LLC, Houston, TX (US)

(72) Inventor: Michael Charles Spalding, Twinsburg, OH (US)

(73) Assignee: Baker Hughes Holdings LLC, Houston, TX (US)

( * ) Notice: Subject to any disclaimer, the term of this patent is extended or adjusted under 35 U.S.C. 154(b) by 0 days.

(21) Appl. No.: 18/097,662

(22) Filed: Jan. 17, 2023

(65) Prior Publication Data

US 2023/0280033 A1    Sep. 7, 2023

Related U.S. Application Data

(60) Provisional application No. 63/317,149, filed on Mar. 7, 2022.

(51) Int. Cl.
   *F02C 9/00* (2006.01)
   *F23R 3/02* (2006.01)
   *G01M 15/14* (2006.01)

(52) U.S. Cl.
   CPC ............... *F23R 3/02* (2013.01); *F02C 9/00* (2013.01); *G01M 15/14* (2013.01)

(58) Field of Classification Search
   CPC ..... F23R 2900/00013; F05D 2260/964; F05D 2270/14; F05D 2270/333; F02C 9/00; F02C 9/28; F23D 2210/00; F23N 5/16; F23N 2229/00; F23N 2229/04; G01J 5/0014; G01J 5/0018; G01J 5/0088

USPC ............................................. 60/39.281, 725
See application file for complete search history.

(56) References Cited

U.S. PATENT DOCUMENTS

| | | | | |
|---|---|---|---|---|
| 5,544,478 | A * | 8/1996 | Shu | F23N 5/082 60/725 |
| 7,112,796 | B2 * | 9/2006 | Brown | G01J 5/602 250/339.08 |
| 7,334,413 | B2 * | 2/2008 | Myhre | F23N 5/082 60/803 |

(Continued)

FOREIGN PATENT DOCUMENTS

KR    20130060962 A    6/2013

*Primary Examiner* — Todd E Manahan
*Assistant Examiner* — Sean V Meiller
(74) *Attorney, Agent, or Firm* — Mintz, Levin, Cohn, Ferris, Glovsky and Popeo, P.C.

(57) ABSTRACT

A method and system for identifying combustion dynamics in a combustion chamber, includes an optical sensor that receives energy from a flame within the combustion chamber. A processor is configured to receive a first signal from the sensor indicative of energy at a first wavelength and a second signal indicative of energy at a second wavelength. The processor can generate a data set of combustion quality indicators from the first signal and the second signal. The processor can convert the data set of combustion quality indicators in a time domain to a combustion quality spectrum in a frequency domain. The processor can analyze the combustion quality spectrum to determine anomalies, wherein the anomalies indicate at least one frequency where combustion dynamics occur in the combustion chamber and output a signal indicative of the at least one frequency where combustion dynamics occur.

16 Claims, 6 Drawing Sheets

(56) References Cited

U.S. PATENT DOCUMENTS

| | | | |
|---|---|---|---|
| 8,153,952 B2 * | 4/2012 | Haffner | G01J 5/0018 |
| | | | 250/208.2 |
| 8,371,102 B1 * | 2/2013 | Lee | F02C 9/28 |
| | | | 356/939 |
| 10,126,164 B2 * | 11/2018 | Spalding | G01J 1/0228 |
| 2018/0216820 A1 | 8/2018 | Bulat et al. | |

* cited by examiner

COMBUSTION QUALITY SPECTRUM

RELATED APPLICATION

This application claims priority under 35 U.S.C. § 119(e) to U.S. Provisional Application No. 63/317,149 filed Mar. 7, 2022, the entire contents of which are hereby expressly incorporated by reference herein.

FIELD OF THE INVENTION

The present invention relates to combustion quality spectrums for use in determining combustion dynamics, also known as combustion acoustics, in a gas turbine.

BACKGROUND OF THE INVENTION

Combustion dynamics includes the phenomenon of pressure oscillations in both, aircraft and land-based power generation turbines. These lead to component wear and damage in the combustion section of the turbine, or other combustion chamber.

Combustion dynamics are a significant issue in many combustion systems from natural gas turbines to rocket engines. The acoustic pressure oscillations or waves created by combustion dynamics can cause devastating damage to the engine hardware bringing operations to a halt. In the gas turbine world, this kind of damage can result in the loss of millions of dollars as the units can't generate any power while they are being repaired.

As these acoustic pressure waves travel and reflect off of the walls of the combustor, they can interact with the incoming air and fuel, creating oscillations in the local equivalence ratio. If these acoustic pressure oscillations are in phase with the oscillations in equivalence ratio (and thus the heat release) of the fuel, then the oscillations in the heat release will be amplified. This creates a feedback loop where the oscillations in acoustic pressure and heat release drive each other to larger and larger amplitudes. If these oscillations are strong enough, the gas turbine will become quite loud and the oscillating loads will transfer to the structure of the gas turbine. If these loads are strong enough, catastrophic failures can occur.

By design, present-day turbines utilize highly unsteady flows to aid in flame stabilization and fuel mixing to operate in a lean, pre-mixed state. This unsteadiness produces local oscillations in the equivalence ratio inside of the turbine. As the local equivalence ratio varies, the burning rate of the fuel varies as well as the heat release of the fuel.

Currently, gas turbine manufacturers need a better understanding and data on the root cause of combustion dynamics. Combustion dynamics is the result of a root cause (flame instability) and a secondary effect that amplifies the pressure oscillations (acoustics). With current dynamic pressure measurements, it is not possible to detect the difference between the root cause and secondary effect. Some combustion dynamics sensors are expensive and are difficult to source and are made from tourmaline crystals. Additionally, many tourmaline crystals come from Africa and the supply can be affected by instability in the region.

SUMMARY OF THE INVENTION

In one aspect a method for identifying combustion dynamics in a combustion chamber is provided. In an embodiment the method can include receiving a first signal indicative of energy from the flame within the combustion chamber at a first wavelength. The method can also include receiving a second signal indicative of energy from the flame at a second wavelength. The method can also include generating a data set of combustion quality indicators from the first signal and the second signal. The method can include converting the data set of combustion quality indicators to a combustion quality spectrum. The method can further include analyzing the combustion quality spectrum to determine anomalies, wherein the anomalies indicate at least one frequency where combustion dynamics occur in the combustion chamber. The method can also include outputting a signal indicative of the at least one frequency where combustion dynamics occur.

In another embodiment the first wavelength can be approximately 310 nm. In another embodiment the second the second wavelength can be in the range of 500 nm-700 nm. In another embodiment the second wavelength can be approximately 600 nm. In another embodiment generating a data set of combustion quality indicators from the first signal and the second signal can include subtracting the first signal from the second signal. In another embodiment generating a data set of combustion quality indicators from the first signal and the second signal can include dividing the second signal by the first signal. Analyzing the combustion quality spectrum to determine anomalies can include identifying positive peaks in the combustion quality spectrum. In another embodiment analyzing the combustion quality spectrum to determine anomalies can include identifying valleys in the combustion quality spectrum. In an embodiment the method can include modifying an input of the combustion chamber, such as air or fuel, based on the signal indicative of the at least one frequency where combustion dynamics occur In another aspect a system for identifying combustion dynamics in a combustion chamber is provided. In an embodiment the system can include at least one sensor that receives energy from the flame within the combustion chamber. The system can also include at least one processor configured to receive a first signal from the at least one sensor indicative of energy at a first wavelength. In an embodiment the processor can be configured to receive a second signal indicative of energy at a second wavelength. The processor can generate a data set of combustion quality indicators from the first signal and the second signal. The processor can convert the data set of combustion quality indicators to a combustion quality spectrum. The processor can also analyze the combustion quality spectrum to determine anomalies, wherein the anomalies indicate at least one frequency where combustion dynamics occur in the combustion chamber. In an embodiment the processor can also be configured to output a signal indicative of the at least one frequency where combustion dynamics occur.

In another embodiment the first wavelength is approximately 310 nm. In another embodiment the second wavelength is in the range of 500 nm-700 nm. In another embodiment the second wavelength is approximately 600 nm. In another embodiment the at least one processor can generate a data set of combustion quality indicators from the first signal and the second signal by subtracting the first signal from the second signal. In another embodiment the at least one processor can generate a data set of combustion quality indicators from the first signal and the second signal by dividing the second signal by the first signal. In another embodiment the at least one processor can analyze the combustion quality spectrum to determine anomalies by identifying positive peaks in the combustion quality spectrum. In another embodiment the at least one processor can analyze the combustion quality spectrum to determine anomalies by identifying valleys in the combustion quality spectrum. In another embodiment the system can include a controller configured to modify an input of the combustion chamber, such as air or fuel, based on the signal indicative of the at least one frequency where combustion dynamics occur.

BRIEF DESCRIPTION OF THE DRAWINGS

The invention will be more fully understood from the following detailed description taken in conjunction with the accompanying drawings, in which.

DETAILED DESCRIPTION

Certain exemplary embodiments will now be described to provide an overall understanding of the principles of the structure, function, manufacture, and use of the devices and methods disclosed herein. One or more examples of these embodiments are illustrated in the accompanying drawings. Those skilled in the art will understand that the devices and methods specifically described herein and illustrated in the accompanying drawings are non-limiting exemplary embodiments and that the scope of the present invention is defined solely by the claims. The features illustrated or described in connection with one exemplary embodiment may be combined with the features of other embodiments. Such modifications and variations are intended to be included within the scope of the present invention.

The present invention focuses on creating a combustion quality spectrum that can be used to detect the root cause of combustion dynamics in a combustion chamber (such as a combustion chamber of a gas turbine), and the frequencies at which combustion dynamics occur. Combustion quality is a characteristic of combustion flames that can be determined using UV and visible light measurements.

Efficient combustion of hydrocarbons occurs when hydrocarbons and $O^2$ are converted to $CO_2$ and $H_2O$. Inefficient combustion is when oxidation of the hydrocarbon is incomplete. Rather than producing just $CO_2$ and $H_2O$, the combustion products include CO, carbon (soot), and unburned hydrocarbons (UHC).

Efficient combustion produces light in certain wavelengths such as 310 nm, which is ultraviolet light. The radiation is chemiluminescence from the OH or hydroxyl radical. Inefficient combustion produces, among others, visible light in the range of 500 nm-700 nm, which is yellow, orange, and red. The light in this range is due to black body radiation of hot soot, UHC, and other molecules.

Figure 1:
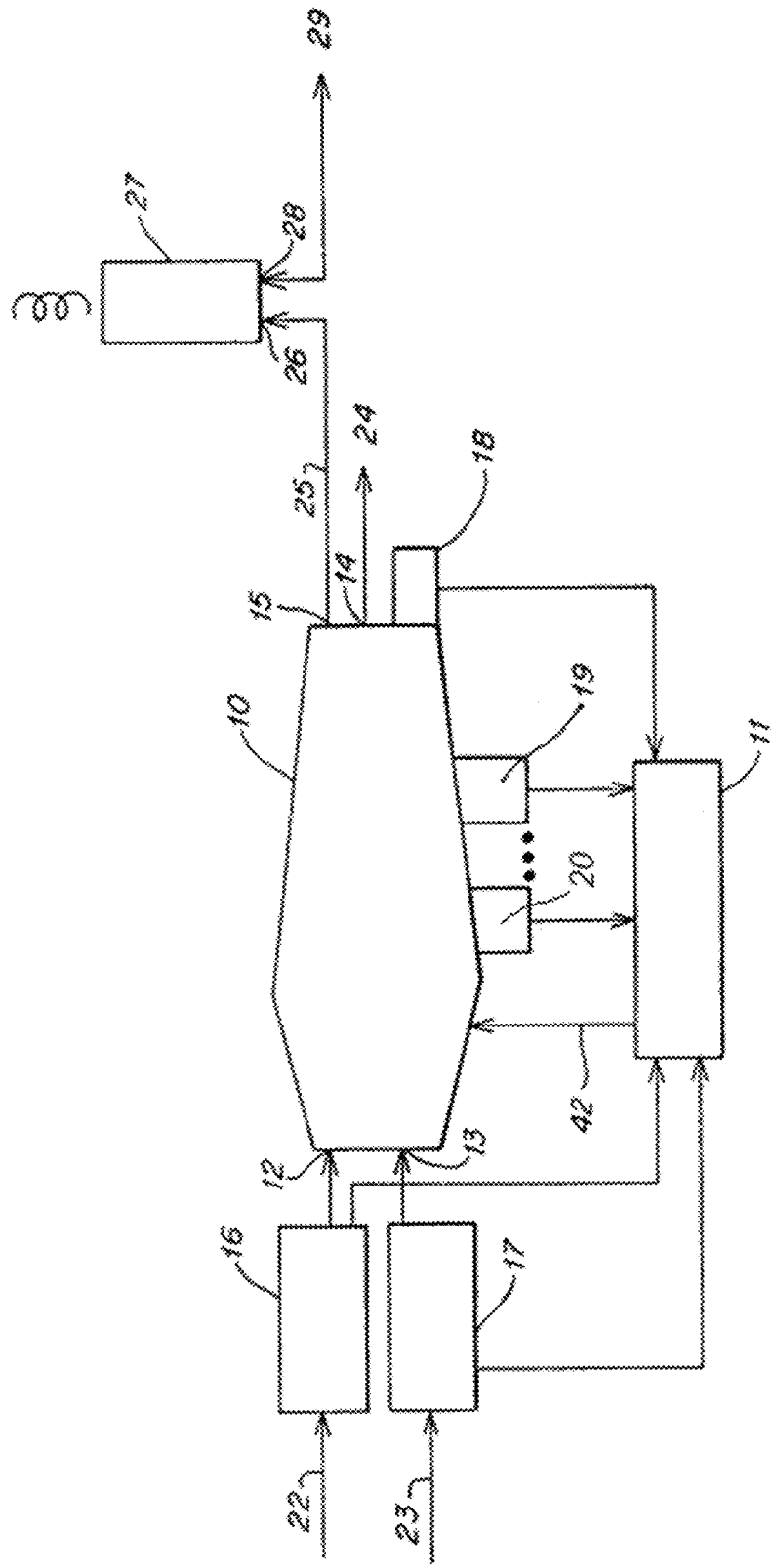
FIG. 1 is a block diagram of a turbine system having a controller.

FIG. 1 depicts a turbine system in accordance with one aspect of the disclosure which can create a combustion quality spectrum that can be used to detect the root cause of combustion dynamics in a turbine. Although a turbine system is described herein, the concepts are equally applicable to burner systems and other flame based systems, and therefore it should be understood that the term "turbine" as used in this disclosure also refers to burners.

FIG. 1 shows a system that can include a turbine 10 coupled to a turbine controller 11. In some embodiments, the controller 11 can have the architecture of computing system 610 discussed below in relation to FIG. 6. The turbine 10 receives air 22 via air inlet 12, receives fuel 23 via fuel inlet 13, generates power 24 at power output 14, and emits exhaust 25 at exhaust outlet 15. Typically, the exhaust outlet 15 is coupled to an input 26 of an exhaust stack 27. The exhaust stack 27 may include additional inputs 28 that receive exhaust 29 from other turbines. An air flow probe 16 is coupled to the air inlet 12 and also coupled to the turbine controller 11. Additionally, a fuel flow probe 17 is coupled to the fuel inlet 13 and also coupled to the turbine controller 11. Although the air flow probe 16 and fuel flow probe 17 are each depicted in FIG. 1 as being external to the turbine 10, either or both may instead be disposed internal to the turbine 10 or anywhere along the respective path of air flow or fuel flow. The turbine system may further include a pressure probe 18, one or more external thermocouples 19, and a sensor 20, each of which is coupled to both the turbine 10 and turbine controller 11. The one or more external thermocouples 19 typically provide temperature measurements of the fuel 23, exhaust 25, turbine surface, and the like.

In operation, the turbine controller 11 receives from the turbine sensors (e.g., air flow probe 16, fuel flow probe 17, pressure probe 18, thermocouple 19, and sensor 20), and provides control signals 42 to control the operation of the turbine 10 according to a desired operating mode. Examples of control signals 42 include signals that control injectors within the turbine, signals that control the amount of fuel input to the turbine 10, signals that control an air/fuel ratio within the turbine, and other control signals as known in the art.

The sensor 20 is configured to detect electromagnetic radiation from the flame within the turbine 10. The sensor 20 can take the form of a single sensor configured to detect electromagnetic radiation having a wavelength in the range of 1 nm to 1000 nm, or the sensor 20 can be a plurality of sensors, each sensor being configured to detect a specific range of wavelengths. For example, a first sensor may be configured to detect ultraviolet radiation in the range of 10 nm to 400 nm, a second sensor may be configured to detect visible light having a wavelength in the range of 400 nm to 700 nm, and a third sensor may be configured to detect a portion of infrared radiation having a range of 700 nm to 1000 nm. In some embodiments, the sensor 20 may take the form of a spectrometer.

The sensor 20 can be configured to output a signal indicative of the energy associated with the electromagnetic radiation from the flame within the turbine 10. The sensor may be configured to output a signal over the entire spectrum of wavelengths from 1 nm to 1000 nm, or may be configured to output one or more signals over smaller ranges of the spectrum. For example, the sensor may output a first signal indicative of energy of the flame at a first wavelength, such as approximately 310 nm, and output a second signal indicative of energy of the flame at a second wavelength, such as approximately 600 nm, or over a range of wavelengths, such as 500 nm to 700 nm.

The controller 11 may include a processor that receives signals from the sensor 20. The processor may use the signals in a method 200, illustrated in FIG. 2, for identifying combustion dynamics in the turbine 10. The processor may include at least one processor configured to execute computer programs, applications, methods, processes, or other software to perform embodiments described in the present disclosure. For example, the processing device may include one or more integrated circuits, microchips, microcontrollers, microprocessors, all or part of a central processing unit (CPU), graphics processing unit (GPU), digital signal processor (DSP), field programmable gate array (FPGA), or other circuits suitable for executing instructions or performing logic operations. The processing device may include at least one processor configured to perform functions of the disclosed methods.

The processing device may include a single core or multiple core processors executing parallel processes simultaneously. In one example, the processing device may be a single core processor configured with virtual processing technologies. The processing device may implement virtual machine technologies or other technologies to provide the ability to execute, control, run, manipulate, store, etc., multiple software processes, applications, programs, etc. In another example, the processing device may include a multiple-core processor arrangement (e.g., dual, quad core, etc.) configured to provide parallel processing functionalities to allow a device associated with the processing device to execute multiple processes simultaneously. It is appreciated that other types of processor arrangements could be implemented to provide the capabilities disclosed herein.

Figure 2:
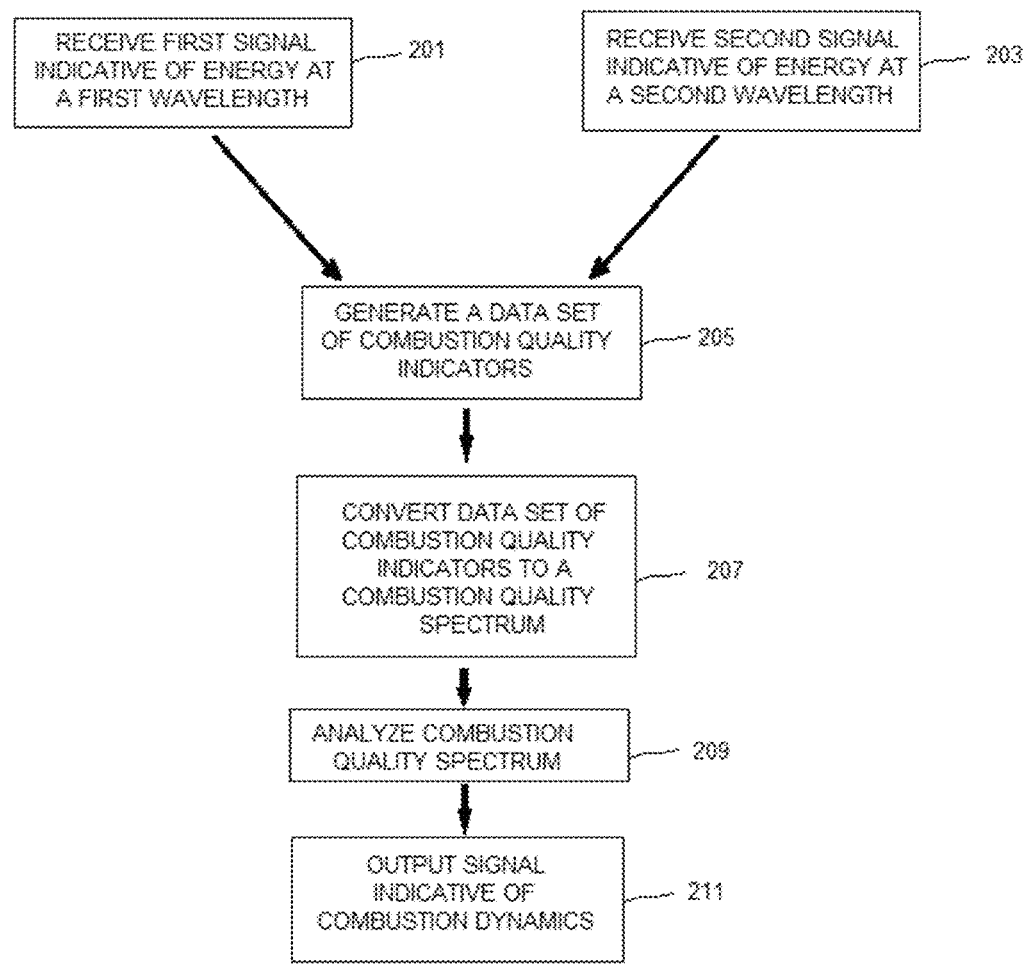
FIG. 2 is a flow chart illustrating a method of identifying combustion dynamics in a combustion chamber.

FIG. 2 illustrates a method 200 according to one aspect of the disclosure, the steps of which can create a combustion quality spectrum that can be used to detect the root cause of combustion dynamics in a turbine. The method 200 is described herein with references made to FIGS. 3-5.

Figure 4:
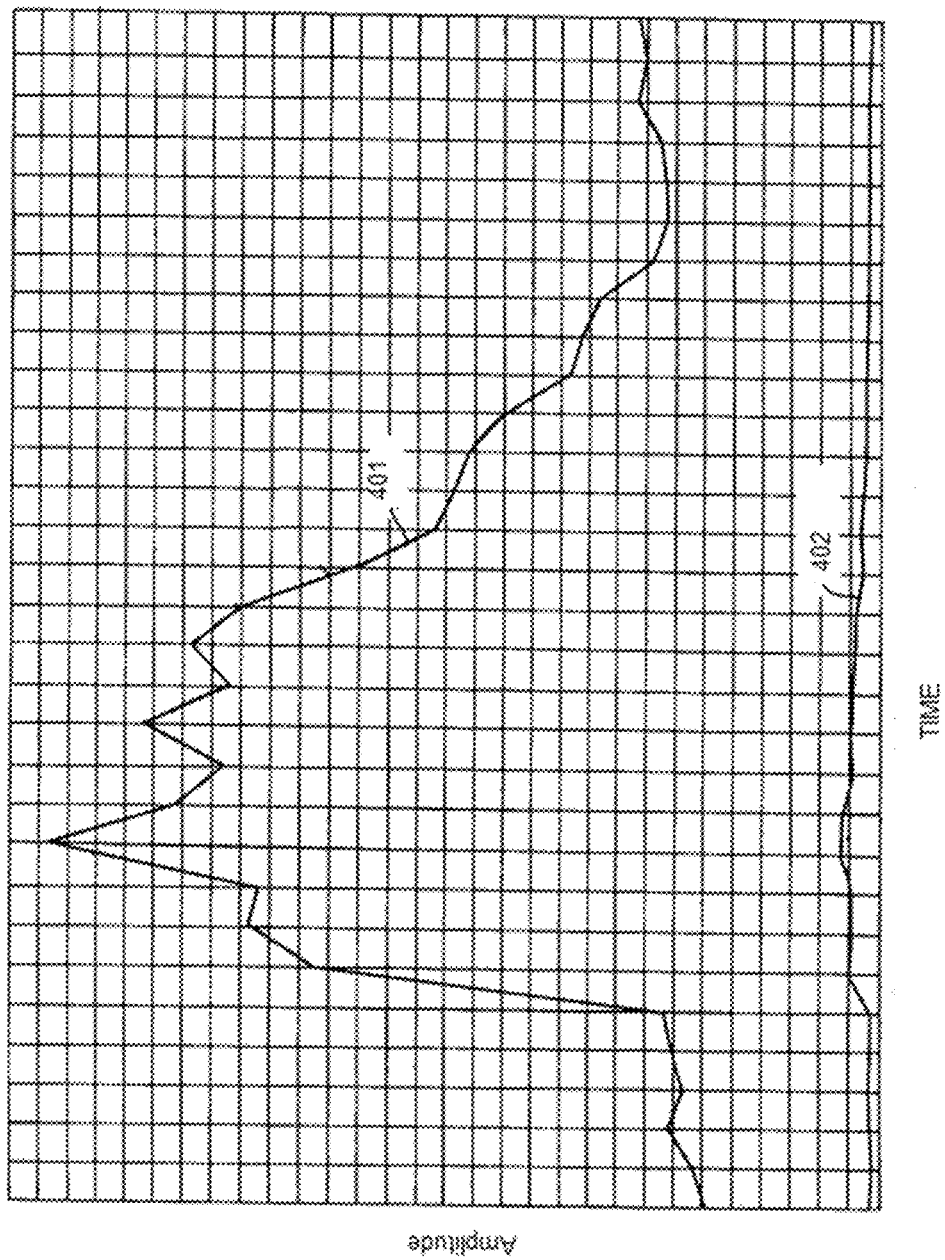
FIG. 4 is a graph illustrating energy measurements at a first and second wavelength.

In step 201, at least one processor may receive a first signal from the flame within the turbine 10 at a first wavelength. The first signal can be received from the sensor 20. The signal can be transmitted over any wired or wireless communication channel. The first wavelength can include any wavelength of electromagnetic radiation emitted from the flame. In some embodiments, the first wavelength can include a wavelength of approximately 310 nm. This particular wavelength correlates to the hydroxyl (OH) radical during combustion. FIG. 4 illustrates a first signal 401 associated with a wavelength of approximately 310 nm over a given period of time. Multiple signal values can be stored in chronological order to make up a first data set in the time domain.

In step 203, at least one processor may receive a second signal from the flame within the turbine 10 at a second wavelength. The second signal can be received from the sensor 20. The signal can be transmitted over any wired or wireless communication channel. The second wavelength can include any wavelength of electromagnetic radiation emitted from the flame. In some embodiments, the second wavelength can include a range of wavelengths from approximately 500 nm-approximately 700 nm. In other embodiments, the second wavelength can include a wavelength of approximately 600 nm. FIG. 4 illustrates a second signal 402 associated with a wavelength of approximately 600 nm over a given period of time. Multiple signal values can be stored in chronological order to make up a second data set in the time domain.

Steps 201 and 203 can occur simultaneously. The time duration for the data acquisition of steps 201 and 203 can be the same. The data sets can be of the same or similar size. In some embodiments, steps 201 and 203 can occur at different times and in any order.

In step 205, at least one processor may generate a data set of combustion quality indicators by utilizing the first data set and the second data set. In one embodiment, a data set of combustion quality indicators can be generated by subtracting the first data set from the second data set. In another embodiment, a data set of combustion quality indicators can be generated by dividing the second data set by the first data set. The resulting data set of combustion quality indicators are in the time domain.

In step 207, at least one processor may convert the data set of combustion quality indicators in the time domain to a data set of combustion quality indicators in the frequency domain. The sensor 20 is configured to acquire data at a rate to allow for analysis of frequencies to at least 1000 Hz. In some embodiments, the analysis may be performed for a frequency range less than 1000 Hz. In other embodiments, the analysis may be performed for a frequency range greater than 1000 Hz. In order to convert the time domain data set to a frequency domain data set, the at least one processor may apply a fast Fourier transform to the time domain data set. The fast Fourier transform converts the data set from its original domain to a representation in the frequency domain. The fast Fourier transform can include a Cooley-Tukey algorithm, prime-factor algorithm, Bruun algorithm, Rader algorithm, Bluestein algorithm, Winograd algorithm, hexagonal fast Fourier transform, or other fast Fourier transform or any combination thereof.

Figure 5:
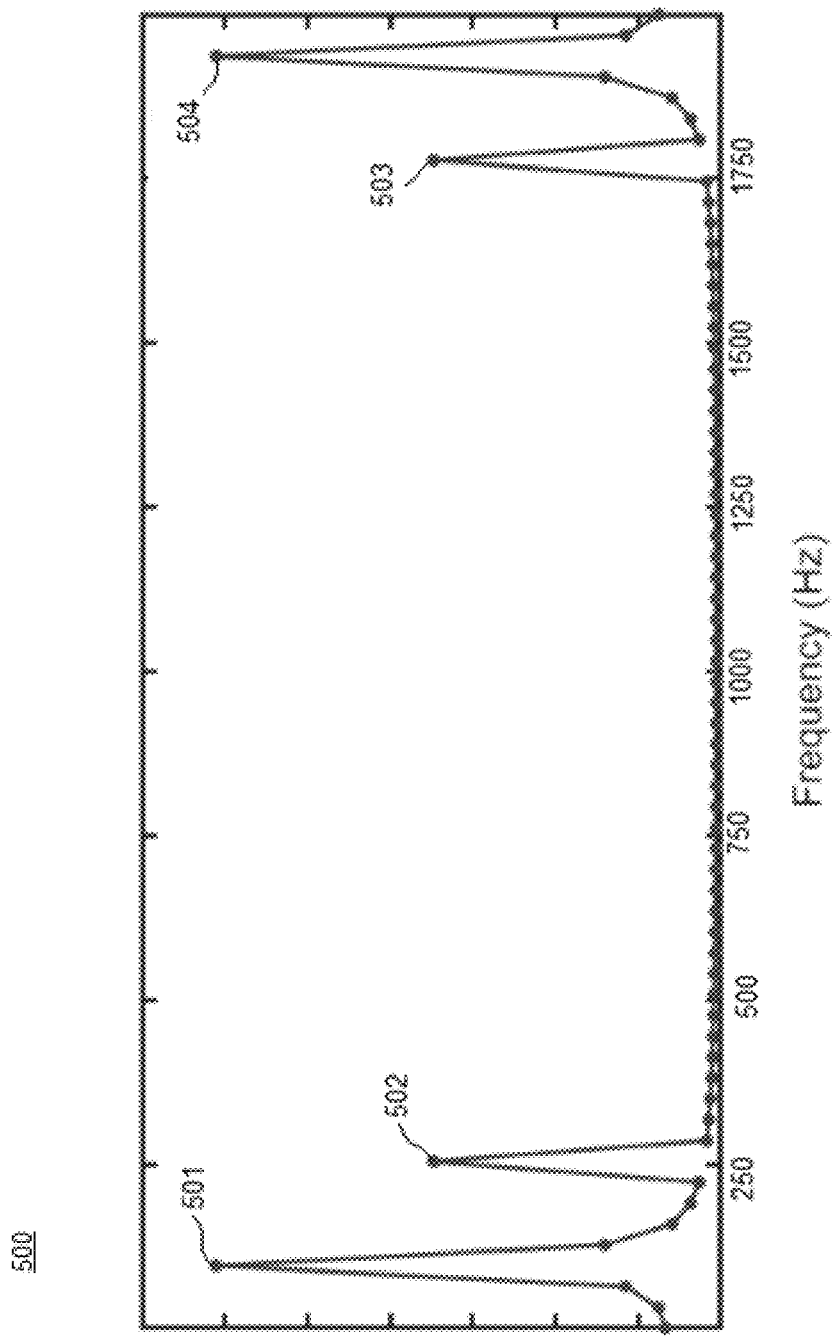
FIG. 5 is a graph illustrating a combustion quality spectrum.

The data set of combustion quality indicators in the frequency domain can also be called a combustion quality spectrum. Each value in the combustion quality spectrum represents the amount of oscillation of the combustion quality at a particular frequency between 1 Hz and 1,000 Hz. FIG. 5 illustrates a combustion quality spectrum 500 for a frequency range up to 2000 Hz. Such a representation can be used to identify variations of combustion quality in the turbine 10. Anomalies, such as peaks 501, 502, 503, and 504 are representative of variations of combustion quality, but can also represent frequencies at which combustion dynamics occur in the turbine 10.

At step 209, the at least one processor may analyze the combustion quality spectrum 500 to determine anomalies. In some embodiments, the anomalies may include peaks 501, 502, 503, and 504. In other embodiments the anomalies may include valleys. In some embodiments the anomalies may take the form of a curve. In some aspects the at least one processor may determine one or more slopes associated with the signal, and identify significant changes in slope. In some aspects the at least one processor may perform the analysis locally. In other aspects, the at least one processor may communicate with a remote processor or database over one or more communication channels. In another aspect one or more machine learning models may be used to analyze the combustion quality spectrum 500.

Figure 3:
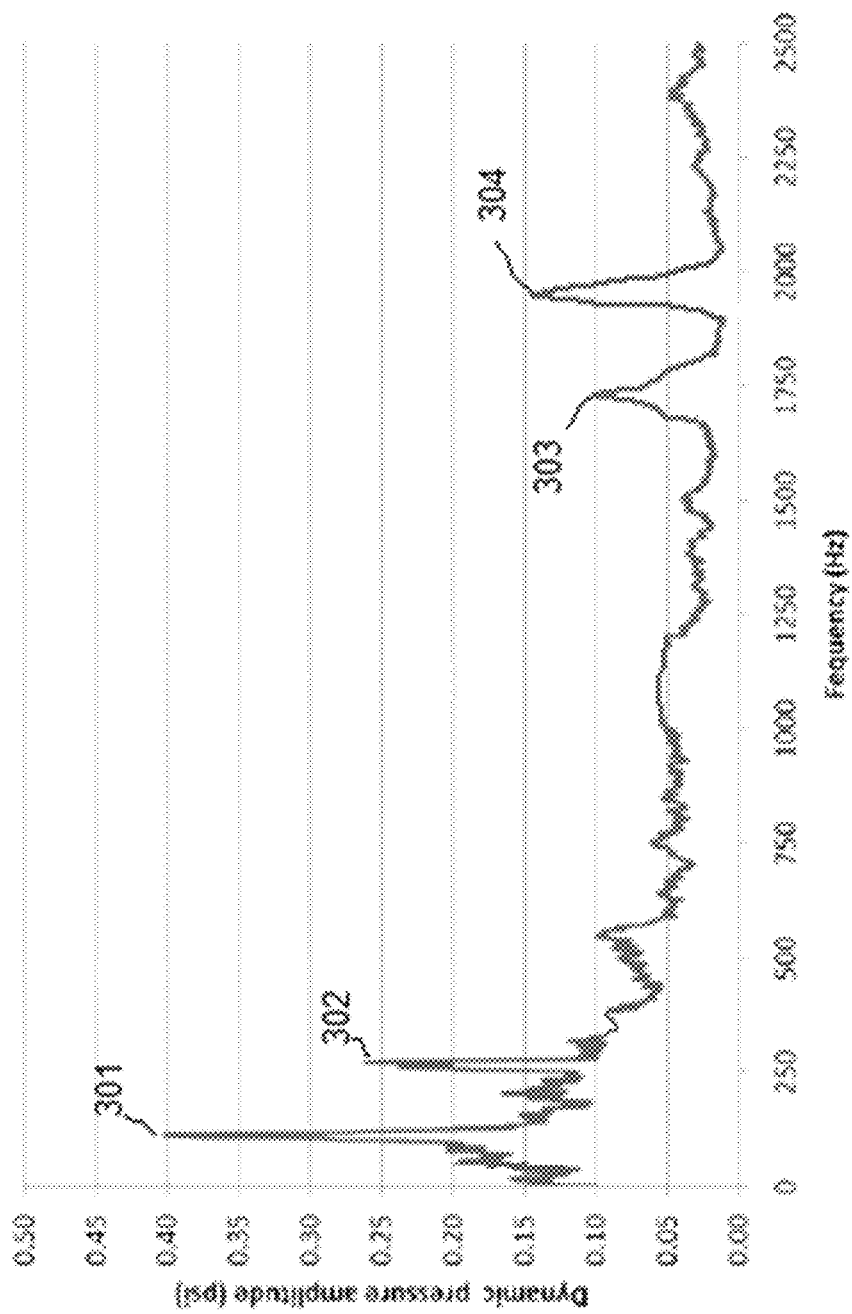
FIG. 3 is a graph illustrating combustion dynamics in a frequency spectrum.

As illustrated in FIG. 5, peak 501 occurs at approximately 100 Hz, peak 502 occurs at approximately 250 Hz, peak 503 occurs at approximately 1750 Hz, and peak 504 occurs at approximately 1925 Hz. The at least one processor can analyze the combustion quality spectrum 500 and determine the frequency associated with the peaks 501, 502, 503, and 504. As discussed above, these frequencies are representative of both variation in combustion quality and frequencies at which combustion dynamics occur it the turbine. This relationship can be seen in FIG. 3. FIG. 3 shows a graph illustrating combustion dynamics of the turbine in a frequency spectrum. A first peak 301 indicates a pressure oscillation at approximately 100 Hz. A second peak 302 indicates a pressure oscillation at approximately 250 Hz. A third peak 303 indicates a pressure oscillation at approximately 1750 Hz, and a fourth peak 304 indicates a pressure oscillation at approximately 1925 Hz. A comparison of the combustion dynamics frequency spectrum in FIG. 3 with the combustion quality spectrum 500 in FIG. 5 shows a correlation between combustion quality variation at specific frequencies and combustion dynamics at the same frequencies. Such a comparison can be performed by original equipment manufacturers of turbines. Once established, optical measurements can be used to identify frequencies at which combustion dynamics occur without the need to rely on pressure sensors within the turbine. This can lead to a much faster measurement and enable a reduction in the number of sensors within a turbine. Additionally, this can also allow a system to differentiate between combustion dynamics originating from flame instability and those caused by acoustics.

At step 211, the at least one processor can output a signal indicative of the at least one frequency where combustion dynamics occur. The signal can be output to a display device, saved as data, or sent to a controller 11 for use in modifying an input into the turbine 10. The controller 11 may modify an input of the turbine, such as fuel or air, based on the output signal.

Figure 6:
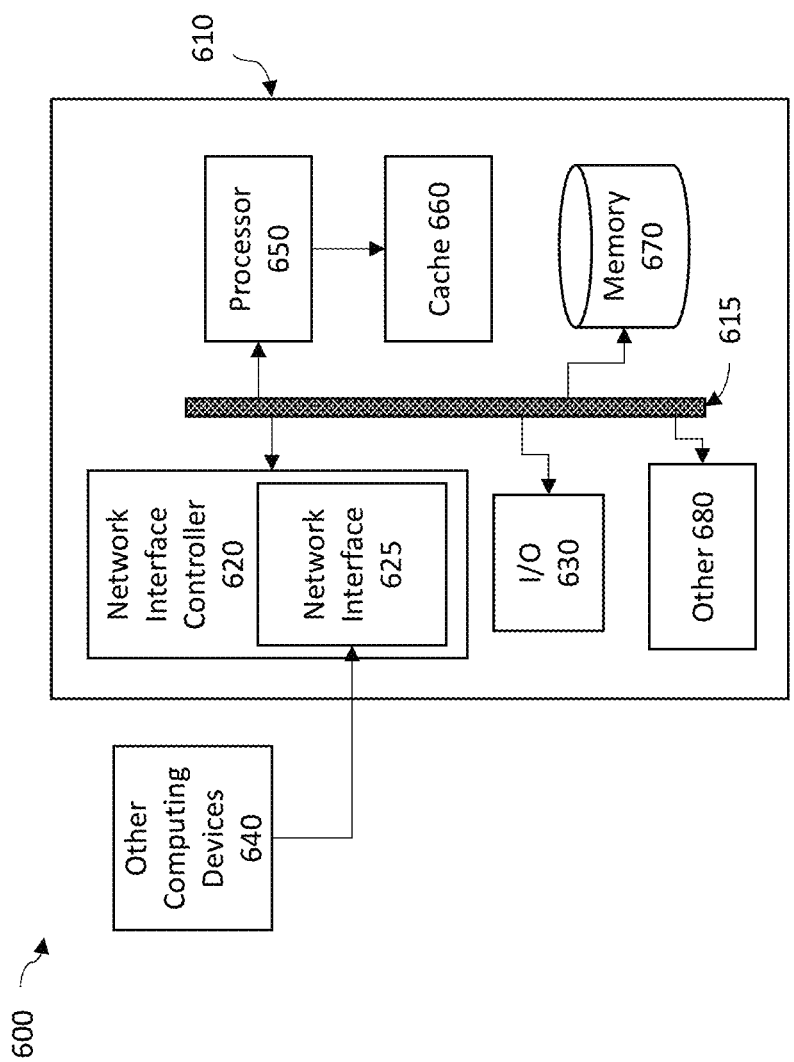
FIG. 6 is a block diagram illustrating a computing system used in identifying combustion dynamics in a combustion chamber.

FIG. 6 is a block diagram 600 of a computing system 610. In some embodiments, the computing device 610 can be the controller 11 (in reference to FIG. 1). In broad overview, the computing system 610 includes at least one processor 650 for performing actions in accordance with instructions, and one or more memory devices 660 and/or 670 for storing instructions and data. The illustrated example computing system 610 includes one or more processors 650 in communication, via a bus 615, with memory 670 and with at least one network interface controller 620 with a network interface 625 for connecting to external devices 630, e.g., a computing device. The one or more processors 650 are also in communication, via the bus 615, with each other and with any I/O devices 630 at one or more I/O interfaces 630, and any other devices 680. The processor 650 illustrated incorporates, or is directly connected to, cache memory 660. Generally, a processor will execute instructions received from memory. In some embodiments, the computing system 610 can be configured within a cloud computing environment, a virtual or containerized computing environment, and/or a web-based microservices environment.

In more detail, the processor 650 can be any logic circuitry that processes instructions, e.g., instructions fetched from the memory 670 or cache 660. In many embodiments, the processor 650 is an embedded processor, a microprocessor unit or special purpose processor. The computing system 610 can be based on any processor, e.g., suitable digital signal processor (DSP), or set of processors, capable of operating as described herein. In some embodiments, the processor 650 can be a single core or multi-core processor. In some embodiments, the processor 650 can be composed of multiple processors.

The memory 670 can be any device suitable for storing computer readable data. The memory 670 can be a device with fixed storage or a device for reading removable storage media. Examples include all forms of non-volatile memory, media and memory devices, semiconductor memory devices (e.g., EPROM, EEPROM, SDRAM, flash memory devices, and all types of solid state memory), magnetic disks, and magneto optical disks. A computing device 610 can have any number of memory devices 670.

The cache memory 660 is generally a form of high-speed computer memory placed in close proximity to the processor 650 for fast read/write times. In some implementations, the cache memory 660 is part of, or on the same chip as, the processor 650.

The network interface controller 620 manages data exchanges via the network interface 625. The network interface controller 620 handles the physical, media access control, and data link layers of the Open Systems Interconnect (OSI) model for network communication. In some implementations, some of the network interface controller's tasks are handled by the processor 650. In some implementations, the network interface controller 620 is part of the processor 650. In some implementations, a computing device 610 has multiple network interface controllers 620. In some implementations, the network interface 625 is a connection point for a physical network link. In some implementations, the network interface controller 620 supports wireless network connections via network interface port 625. Generally, a computing device 610 exchanges data with other network devices, such as other computing devices 640, via physical or wireless links to a network interface 625. In some implementations, the network interface controller 620 implements a network protocol such as LTE, TCP/IP Ethernet, IEEE 802.11, IEEE 802.16, or the like.

The other computing devices 640 are connected to the computing device 610 via a network interface port 625. In some embodiments, the other computing devices 640 can be similar to computing device 610. The other computing device 640 can be a peer computing device, a network device, or any other computing device with network functionality. In some embodiments, the other computing devices 640 can include a server or a network device such as a hub, a bridge, a switch, or a router, connecting the computing device 610 to a data network such as the Internet.

In some embodiments, the computing device 610 can be the controller 11 (in reference to FIG. 1). In this embodiment, the other computing devices 640 can include the air flow probe 16, fuel flow probe 17, pressure probe 18, thermocouple 19, and sensor 20 (in reference to FIG. 1).

In some uses, the I/O interface 630 supports an input device and/or an output device (not shown). In some uses, the input device and the output device are integrated into the same hardware, e.g., as in a touch screen. In some uses, such as in a server context, there is no I/O interface 630 or the I/O interface 630 is not used. In some uses, additional other components 680 are in communication with the computer system 610, e.g., external devices connected via a universal serial bus (USB).

The other devices 680 can include an I/O interface 630, external serial device ports, and any additional co-processors. For example, a computing system 610 can include an interface (e.g., a universal serial bus (USB) interface, or the like) for connecting input devices (e.g., a keyboard, microphone, mouse, or other pointing device), output devices (e.g., video display, speaker, refreshable Braille terminal, or printer), or additional memory devices (e.g., portable flash drive or external media drive). In some implementations an I/O device is incorporated into the computing system 610, e.g., a touch screen on a tablet device. In some implementations, a computing device 610 includes an additional device 680 such as a co-processor, e.g., a math co-processor that can assist the processor 650 with high precision or complex calculations.

The improved system, devices, and methods described herein addresses the technical problem of determining a root cause of combustion dynamics in a turbine and frequencies at which combustion dynamics occur. The improved system, devices, and methods allow for optically detecting combustion dynamics and allows for differentiation between flame instability and acoustics of the turbine or acoustics of the pressure sensors.

Exemplary embodiments of this disclosure are described herein, including the best mode known to the inventors for carrying out the disclosure. Variations of those embodiments may become apparent to those of ordinary skill in the art upon reading the foregoing description. The inventors expect skilled artisans to employ such variations as appropriate, and the inventors intend for the disclosure to be practiced otherwise than as specifically described herein. Accordingly, this disclosure includes all modifications and equivalents of the subject matter recited in the claims appended hereto as permitted by applicable law. Moreover, any combination of the above described elements in all possible variations thereof is encompassed by the disclosure unless otherwise indicated herein or otherwise clearly contradicted by context.

The use of the terms "a" and "an" and "the" and similar referents in the context of describing the disclosure (especially in the context of the following claims) is to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "approximately" includes within 1, 2, 3, or 4 standard deviations. In certain embodiments, the term "about" or "approximately" means within 50%, 20%, 15%, %, 9%, 8%, 7%, 6%, 5%, 4%, 3%, 2%, 1%, 0.5%, or 0.05% of a given value or range. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the disclosure and does not pose a limitation on the scope of the disclosure unless otherwise claimed. No language in the specification should be construed as indicating any non-claimed element as essential to the practice of the disclosure.

What is claimed is:

1. A method for identifying combustion dynamics in a combustion chamber, comprising:
   receiving a first signal from a flame corresponding to energy at a first wavelength characteristic of efficient combustion within the combustion chamber;
   receiving a second signal from the flame corresponding to energy at a second wavelength characteristic of inefficient combustion within the combustion chamber, wherein the second wavelength is different from the first wavelength;
   generating a data set in a time domain, the data set characterizing a measure of combustion quality, based on a difference between the first signal and the second signal;
   converting the data set in the time domain into a combustion quality spectrum in a frequency domain;
   analyzing the combustion quality spectrum to determine anomalies, wherein the anomalies indicate at least one frequency where combustion dynamics occur in the combustion chamber; and
   outputting the combustion quality spectrum, including a signal indicative of the at least one frequency where combustion dynamics occur.

2. The method of claim 1, wherein the first wavelength is approximately 310 nm.

3. The method of claim 1, wherein the second wavelength is in the range of 500 nm-700 nm.

4. The method of claim 3, wherein the second wavelength is within 15% of 600 nm.

5. The method of claim 1, wherein analyzing the combustion quality spectrum to determine anomalies comprises identifying positive peaks in the combustion quality spectrum.

6. The method of claim 1, wherein analyzing the combustion quality spectrum to determine anomalies comprises identifying valleys in the combustion quality spectrum.

7. The method of claim 1, further comprising:
   modifying an input of the combustion chamber based on the signal indicative of the at least one frequency where combustion dynamics occur.

8. The method of claim 7, wherein the input comprises one of air and fuel.

9. A system for identifying combustion dynamics in a combustion chamber, comprising:
   at least one sensor that receives energy from a flame within the combustion chamber;
   at least one processor configured to:
      receive a first signal from a flame, from the at least one sensor, corresponding to energy at a first wavelength characteristic of efficient combustion;
      receive a second signal from the flame, from the at least one sensor, corresponding to energy at a second wavelength characteristic of inefficient combustion, wherein the second wavelength is different from the first wavelength;
      generate a data set in a time domain, the data set characterizing a measure of combustion quality, based on a difference between the first signal and the second signal;
      convert the data set in the time domain into a combustion quality spectrum in a frequency domain;
      analyze the combustion quality spectrum to determine anomalies, wherein the anomalies indicate at least one frequency where combustion dynamics occur in the combustion chamber; and
      output the combustion quality spectrum, including a signal indicative of the at least one frequency where combustion dynamics occur.

10. The system of claim 9, wherein the first wavelength is approximately 310 nm.

11. The system of claim 9, wherein the second wavelength is in the range of 500 nm-700 nm.

12. The system claim 11, wherein the second wavelength is within 15% of 600 nm.

13. The system of claim 9, wherein the at least one processor analyzes the combustion quality spectrum to determine anomalies by identifying positive peaks in the combustion quality spectrum.

14. The system of claim 9, wherein the at least one processor analyzes the combustion quality spectrum to determine anomalies by identifying valleys in the combustion quality spectrum.

15. The system of claim 1, further comprising a controller configured to modify an input of the combustion chamber based on the signal indicative of the at least one frequency where combustion dynamics occur.

16. The system of claim 15, wherein the input comprises one of air and fuel.

* * * * *